US008602871B2

(12) United States Patent
Wadleigh et al.

(10) Patent No.: US 8,602,871 B2
(45) Date of Patent: Dec. 10, 2013

(54) GAMING SYSTEM, GAMING DEVICE, AND GAMING METHOD FOR TRANSFERRING SYMBOLS BETWEEN LINKED REELS IN MULTIPLE REEL SETS

(75) Inventors: William R. Wadleigh, Cedar Falls, IA (US); Erick T. Ching, Reno, NV (US)

(73) Assignee: IGT, Las Vegas, NV (US)

( * ) Notice: Subject to any disclaimer, the term of this patent is extended or adjusted under 35 U.S.C. 154(b) by 4 days.

(21) Appl. No.: 13/437,453

(22) Filed: Apr. 2, 2012

(65) Prior Publication Data

US 2012/0190428 A1 Jul. 26, 2012

Related U.S. Application Data

(62) Division of application No. 11/937,770, filed on Nov. 9, 2007, now Pat. No. 8,162,741.

(51) Int. Cl.
*A63F 13/00* (2006.01)

(52) U.S. Cl.
USPC .................. 463/20; 463/16; 463/25; 463/32; 463/42

(58) Field of Classification Search
USPC .................................. 463/16, 20, 25, 32, 42
See application file for complete search history.

(56) References Cited

U.S. PATENT DOCUMENTS 4,099,722 A 7/1978 Rodesch et al.
4,200,291 A 4/1980 Hooker
4,357,567 A 11/1982 Rock
4,636,951 A 1/1987 Harlick
4,695,053 A 9/1987 Vazquez et al.
4,790,537 A 12/1988 Smyth et al.
4,826,169 A 5/1989 Bessho et al.
4,874,173 A 10/1989 Kishishita
5,205,555 A 4/1993 Hamano
(Continued)

FOREIGN PATENT DOCUMENTS

AU 755879 2/2001
EP 058488 8/1982
(Continued)

OTHER PUBLICATIONS

It's a Blast, written by IGT, published on or before Dec. 2004.

(Continued)

*Primary Examiner* — Arthur O. Hall
*Assistant Examiner* — Shahid Kamal
(74) *Attorney, Agent, or Firm* — Neal, Gerber & Eisenberg LLP

(57) ABSTRACT

A gaming device including at least a first reel in a first reel set linked to at least a first reel in a second reel set and at least a second reel in the first reel set not linked to any reel in any second reel set. In a play of the game, symbols are independently generated for each reel set. After an award evaluation, the gaming device removes zero, one, or more symbols from the reels in the reel sets. If any empty symbol positions are formed on the first reel in the second reel set, the gaming device transfers one or more symbols from the first reel of the first reel set to the linked first reel of the second reel set to occupy the empty symbol positions. The gaming device generates symbols to fill the empty symbol positions and provides any awards for any winning symbol combinations.

16 Claims, 11 Drawing Sheets

(56) References Cited

U.S. PATENT DOCUMENTS

| | | | |
|---|---|---|---|
| RE34,244 | E | 5/1993 | Hagiwara |
| 5,564,700 | A | 10/1996 | Celona |
| 5,624,119 | A | 4/1997 | Leake |
| 5,704,835 | A | 1/1998 | Dietz |
| 5,720,662 | A | 2/1998 | Holmes et al. |
| 5,722,891 | A | 3/1998 | Inoue |
| 5,807,172 | A | 9/1998 | Piechowiak |
| 5,813,911 | A | 9/1998 | Margolin |
| 5,882,260 | A | 3/1999 | Marks et al. |
| 5,934,672 | A * | 8/1999 | Sines et al. ................ 273/143 R |
| 5,951,397 | A | 9/1999 | Dickinson |
| 5,980,384 | A | 11/1999 | Barrie |
| 6,089,977 | A | 7/2000 | Bennett |
| 6,117,013 | A | 9/2000 | Eiba |
| 6,120,377 | A | 9/2000 | McGinnis et al. |
| 6,139,124 | A | 10/2000 | Kling |
| 6,174,235 | B1 | 1/2001 | Walker et al. |
| 6,203,009 | B1 | 3/2001 | Sines et al. |
| 6,220,959 | B1 | 4/2001 | Holmes et al. |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,254,481 | B1 | 7/2001 | Jaffe |
| 6,270,412 | B1 | 8/2001 | Crawford et al. |
| 6,311,976 | B1 | 11/2001 | Yoseloff et al. |
| 6,318,721 | B1 | 11/2001 | Randall et al. |
| 6,347,996 | B1 | 2/2002 | Gilmore et al. |
| 6,394,902 | B1 | 5/2002 | Glavich et al. |
| 6,398,644 | B1 | 6/2002 | Perrie et al. |
| 6,409,602 | B1 | 6/2002 | Wilshire et al. |
| 6,413,162 | B1 | 7/2002 | Baerlocher et al. |
| 6,419,579 | B1 | 7/2002 | Bennett |
| 6,464,581 | B1 | 10/2002 | Yoseloff et al. |
| 6,517,432 | B1 | 2/2003 | Jaffe |
| 6,604,740 | B1 | 8/2003 | Singer et al. |
| 6,634,945 | B2 | 10/2003 | Glavich et al. |
| 6,641,477 | B1 | 11/2003 | Dietz |
| 6,666,767 | B1 | 12/2003 | Dayan |
| 6,695,696 | B1 | 2/2004 | Kaminkow |
| 6,702,671 | B2 | 3/2004 | Tarantino |
| 6,712,693 | B1 | 3/2004 | Hettinger |
| 6,805,349 | B2 | 10/2004 | Baerlocher et al. |
| 6,832,957 | B2 | 12/2004 | Falconer |
| 6,855,054 | B2 * | 2/2005 | White et al. .................... 463/21 |
| 6,875,106 | B2 | 4/2005 | Weiss et al. |
| 6,896,617 | B2 | 5/2005 | Daly |
| 6,905,405 | B2 * | 6/2005 | McClintic ....................... 463/16 |
| 6,921,334 | B1 * | 7/2005 | Bennett ........................... 463/16 |
| 6,942,571 | B1 | 9/2005 | McAllister et al. |
| 6,960,133 | B1 | 11/2005 | Marks et al. |
| 7,052,395 | B2 | 5/2006 | Glavich et al. |
| 7,070,502 | B1 | 7/2006 | Bussick et al. |
| 7,077,745 | B2 | 7/2006 | Gomez et al. |
| 7,108,602 | B2 | 9/2006 | Daly |
| 7,144,322 | B2 | 12/2006 | Gomez et al. |
| 7,252,591 | B2 | 8/2007 | Van Asdale |
| 7,294,058 | B1 | 11/2007 | Slomiany et al. |
| 7,311,607 | B2 * | 12/2007 | Tedsen et al. ................... 463/32 |
| 7,699,698 | B2 * | 4/2010 | Randall ........................... 463/20 |
| 8,162,741 | B2 * | 4/2012 | Wadleigh et al. ............... 463/20 |
| 8,444,473 | B2 * | 5/2013 | Ching et al. .................... 463/20 |
| 2002/0068623 | A1 | 6/2002 | Gauselmann |
| 2002/0077165 | A1 | 6/2002 | Bansemer et al. |
| 2003/0036422 | A1 * | 2/2003 | Baerlocher et al. ............. 463/20 |
| 2003/0045345 | A1 | 3/2003 | Bermin |
| 2003/0054874 | A1 | 3/2003 | Kaminkow |
| 2003/0057645 | A1 | 3/2003 | Baerlocher et al. |
| 2003/0060267 | A1 | 3/2003 | Glavich et al. |
| 2003/0100356 | A1 | 5/2003 | Brown et al. |
| 2004/0033829 | A1 | 2/2004 | Pacey et al. |
| 2004/0048651 | A1 | 3/2004 | Vorias et al. |
| 2004/0097280 | A1 * | 5/2004 | Gauselmann ................... 463/16 |
| 2005/0148381 | A1 | 7/2005 | Marks et al. |
| 2005/0282620 | A1 | 12/2005 | Marks et al. |
| 2005/0288094 | A1 | 12/2005 | Marks et al. |
| 2006/0172795 | A1 | 8/2006 | Bussick et al. |
| 2007/0060248 | A1 | 3/2007 | Rodgers et al. |
| 2008/0045309 | A1 * | 2/2008 | Okada ............................. 463/20 |
| 2008/0051174 | A1 | 2/2008 | Fiden |
| 2008/0108409 | A1 * | 5/2008 | Cole et al. ....................... 463/20 |
| 2008/0113735 | A1 * | 5/2008 | Maya .............................. 463/20 |
| 2008/0182644 | A1 * | 7/2008 | Lutnick et al. .................. 463/20 |
| 2009/0104964 | A1 * | 4/2009 | Snow .............................. 463/20 |
| 2009/0124342 | A1 * | 5/2009 | Fong ............................... 463/20 |
| 2009/0227337 | A1 * | 9/2009 | Langille et al. ................. 463/20 |
| 2011/0130193 | A1 * | 6/2011 | Belger et al. .................... 463/20 |

FOREIGN PATENT DOCUMENTS

| | | |
|---|---|---|
| EP | 060019 | 9/1982 |
| EP | 1 063 622 | 12/2000 |
| GB | 1 454 046 | 10/1976 |
| GB | 2 062 922 | 5/1981 |
| GB | 2 106 293 | 9/1981 |
| GB | 2 097 160 | 10/1982 |
| GB | 2 106 295 | 4/1983 |
| GB | 2 165 385 | 4/1986 |
| GB | 2 180 087 | 8/1989 |
| GB | 2 243 236 | 4/1990 |
| GB | 2 372 132 | 2/2001 |
| WO | WO 98/20949 | 5/1998 |
| WO | WO 00/30727 | 6/2000 |
| WO | WO 2006/076294 | 7/2006 |
| WO | WO 2007/002935 | 1/2007 |
| WO | WO 2007/130443 | 11/2007 |
| WO | WO 2007/130444 | 11/2007 |

OTHER PUBLICATIONS

Kaboom website, written by WMS Gaming, published on or before Nov. 2007.

All That Glitters website, written by WMS Gaming, published on or before Nov. 2007.

A Study in Slot Machine Research and Development, written by John Brokopp, published at www.casinocitytimes.com on Nov. 30, 2005.

* cited by examiner

GAMING SYSTEM, GAMING DEVICE, AND GAMING METHOD FOR TRANSFERRING SYMBOLS BETWEEN LINKED REELS IN MULTIPLE REEL SETS

PRIORITY CLAIM

This application is a divisional of, claims priority to and the benefit of U.S. patent application Ser. No. 11/937,770, filed on Nov. 9, 2007 the entire contents of which are incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Another known gaming machine includes game elements that are assigned to a single matrix of game element locations. In this gaming machine, play is initiated by evaluating the game elements for predetermined transformative conditions, such as a match of game elements. If a transformative condition is found, the game element(s) are transformed with at least one being removed from the single matrix. The remaining game elements are moved, if permitted, according to a movement methodology. The steps of evaluating, transforming, removing, and moving the remaining game elements are repeated so long as a transformation is subsequently available for continued gameplay. Such games have been relatively popular, though they are hampered by their inherently limited volatility due to the limited number of paylines. There is a continuing need to provide new and different gaming machines with such features that increase volatility and therefore increase player excitement.

SUMMARY

The gaming system, gaming device, and gaming method disclosed herein provide a game having the removal and replacement of symbols from a plurality of linked sets of symbols in an integrated manner.

In various embodiments, the gaming device includes a plurality of matrices of symbol positions. In one such embodiment, each matrix of symbol positions is formed from a different set of a plurality of reels. In one embodiment, at least a first reel in a first reel set is associated with or linked to at least a first reel in a second reel set and at least a second reel in the first reel set not associated with or linked to any reel in any second reel set. In a play of the game, symbols are independently generated for each reel set and the symbols displayed for each reel set are independently evaluated to provide any awards for any winning symbols or winning symbol combinations. After the evaluation, the gaming device removes zero, one, or more symbols from reels in the reel sets to leave zero, one, or more empty symbol positions. In one embodiment, if any empty symbol positions are formed on the first reel in the second reel set, the gaming device shifts or transfers one or more symbols from the first reel of the first reel set to the linked first reel of the second reel set to occupy the one or more empty symbol positions. In this embodiment, if there are any empty symbol positions on the second reel of the second reel set, the gaming device does not shift or transfer any symbols from the second reel of the first reel set to the second reel of the second reel set. The gaming device then generates symbols to fill the empty symbol positions in the reel sets and the symbols displayed for each reel set are independently evaluated to provide any awards for any winning symbols or winning symbol combinations. In one embodiment, it should be appreciated that this gaming device utilizes a symbol initially generated from a symbol map of one reel set to determine an award with a plurality of symbols initially generated from another symbol map of another reel set. Such a configuration provides the player with additional opportunities to win awards in association with multiple reel sets.

In one embodiment, the gaming system, gaming device, and gaming method disclosed herein include a plurality of matrices. In one embodiment, each matrix is formed by the reels in a reel set such that the gaming device includes a plurality of reel sets. In one such embodiment, the reel sets are arranged such that at least one reel in each reel set is linked to at least one reel in another reel set. In one example embodiment, a gaming device has two reel sets, wherein a first reel from the first reel set is linked to and displayed as aligned with a first reel from the second reel set. In this example, a second reel in the first reel set is not linked to any second reel in the second reel set.

In operation of one embodiment of the gaming device disclosed herein, for each individual reel set, the gaming device generates and displays a plurality of symbols in a plurality of symbol positions on the reels. The symbols are generated independently for each of the plurality of reel sets. That is, initial generation of symbols in the symbol positions on the reels in each reel set does not depend on the generation of symbols in the symbol positions on reels in any other reel set. In one embodiment, the symbols available differ for each reel set. In operation of one such embodiment, symbols generated in one reel set cannot be part of a winning symbol combination for the reel set in which they are generated, but can be part of a winning symbol combination for another reel set. That is, it is only after certain symbols are shifted from the reel set in which they were generated to another reel set that they can become part of a winning symbol combination. In another embodiment, when certain symbols from one reel set form a winning symbol combination with symbols from another reel set, a greater award is provided than when these symbols form winning symbol combinations with the symbols from the same reel set in which they were generated initially. In another embodiment, the gaming device generates symbols in one reel set that cannot be generated in another reel set.

The gaming device analyzes the symbols generated to determine any winning symbols or winning symbol combinations. For each of any winning symbols or winning symbol combinations generated, the gaming device provides the player an award associated with the generated winning symbol or winning symbol combination. In one embodiment, if there are any winning symbols or winning symbol combinations, the gaming device removes one or more of the symbols from one or more of any determined winning symbol combinations, thus leaving one or more of the reels with at least one empty symbol position.

In one embodiment, for each empty symbol position on a reel that is linked to at least another reel in another reel set, the gaming device shifts or transfers one or more symbols generated on one of the reels to the empty symbol position on the reel linked to the reel with an empty symbol position. In the example embodiment described above, if a symbol is removed from a symbol position on a first reel in the second reel set (and the first reel of the second reel set is linked to the first reel in the first reel set), the gaming device shifts or transfers one or more symbols generated on the first reel of the first reel set and/or one or more symbols generated on the first reel of the second reel set such that one of the transferred symbols fills the empty position. For example, if the gaming device generates a cherry symbol on the first reel in the first reel set and an empty symbol position occurs on the first reel in the second reel set (which is linked to the first reel in the first reel set), the gaming device shifts or transfers the cherry symbol from the first reel in the first reel set to the empty symbol position on the first reel in the second reel set. In one embodiment, the gaming device repeats this shifting or transferring for zero, one, or more symbols for any empty symbol positions on the linked reels in the reel sets.

In one embodiment, for each empty symbol position on a reel in a reel set that is not linked to at least one reel in another reel set, the gaming devices shifts or transfers one or more symbols generated on the non-linked reel to the empty symbol position on the same reel. In the example described above, if a symbol is removed from a second reel in the first reel set (that is not linked to any reel in the second reel set), the gaming device shifts or transfers a symbol generated in a symbol position on the second reel in the first reel set to replace the removed symbol from the second reel in the first reel set. In this embodiment, the gaming device does not shift or transfer symbols from the second, non-linked reel in the first reel set to fill the empty symbol position of the second reel in the second reel set. For example, if the gaming device generates a cherry symbol on the second reel in the first reel set and an empty symbol position occurs on the second reel in the second reel set (which is not linked to the second reel in the first reel set), the gaming device shifts or transfers symbols within the second reel in the second reel set and does not shift or transfer the cherry symbol from the second reel in the first reel set to the second reel in the second reel set.

After shifting or transferring one or more generated symbols to fill any removed symbol positions, the gaming device generates and displays a symbol in each empty symbol position previously occupied by a shifted or transferred symbol. The gaming device proceeds in determining any winning symbols or winning symbol combinations, removing any symbols, and shifting any symbols as described above until no winning symbol or winning symbol combination is displayed. In an alternative embodiment, the gaming device proceeds as described above and analyzes the symbols generated to determine any winning symbols or winning symbol combinations. In this embodiment, rather than removing symbols, the gaming device provides the player an award associated with the generated winning symbol or winning symbol combination and ends the game.

In one such embodiment, for a first reel in the first reel set that is linked to a first reel in the second reel set, the gaming device shifts or transfers each of the symbols on the first reel in the first reel set and each of the symbols on the first reel in the second reel set by one or more symbol positions. In one example embodiment, the gaming device shifts or transfers one or more symbols from the first reel in the first reel set to the first reel in the second reel set, and removes one or more symbols from the first reel of the second reel set. When performing this shift or transfer, the gaming device creates one or more empty symbol positions on the first reel of the first reel set. For example, if the gaming device generates a cherry symbol on the first reel in the first reel set, the gaming device shifts or transfers at least the cherry symbol from the first reel of the first reel set to the first reel of the second reel set (which is linked to the first reel of the first reel set). Moreover, the gaming device shifts or transfers each symbol in the first reel of the first reel set by at least one symbol position within the first reel of the first reel set, creating at least one empty symbol position on the first reel in the first reel set. The gaming device shifts or transfers each symbol on the first reel of the second reel set by at least one symbol position within the first reel of the second reel set. At least one symbol on the first reel in the second reel set is removed from the first reel of the second reel set as a result of the shift or transfer in the above example.

In another embodiment, for each reel in any reel set that is not linked to at least another reel in another reel set, the gaming device does not perform a shift or transfer. In an alternative embodiment, the gaming device performs a shift or transfer within a reel in a reel set that is not linked to another reel in another reel set. In this embodiment, each symbol on a reel in a reel set not linked to another reel in another reel set is shifted or transferred by at least one position in a given direction. Also in this embodiment, at least one symbol is removed from the reel in the reel set not linked to another reel in another reel set. In this embodiment, the gaming device does not shift or transfer any symbols from the reel in the reel set not linked to another reel in another reel set to any other reel in any other reel set.

In one embodiment, after performing a shift or transfer, the gaming device generates and displays a symbol in each empty symbol position previously occupied by any shifted or transferred symbol. In one embodiment, the gaming device proceeds in determining any winning symbols or winning symbol combinations and shifting or transferring as described above until no winning symbol or winning symbol combination as described above.

Accordingly, the gaming device disclosed herein provides for one or more symbols initially generated by a first reel of a first reel set to be utilized in an award determination linked to a different reel of a different reel set. That is, this gaming device utilizes a symbol initially generated from a symbol map of one reel set to determine an award with a plurality of symbols initially generated from another symbol map of another reel set. By shifting or transferring a symbol from one reel set to another reel set, the gaming device disclosed herein provides increased volatility over prior, single reel set gaming devices. Such a configuration provides the player with additional opportunities to win awards in association with multiple reel sets.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
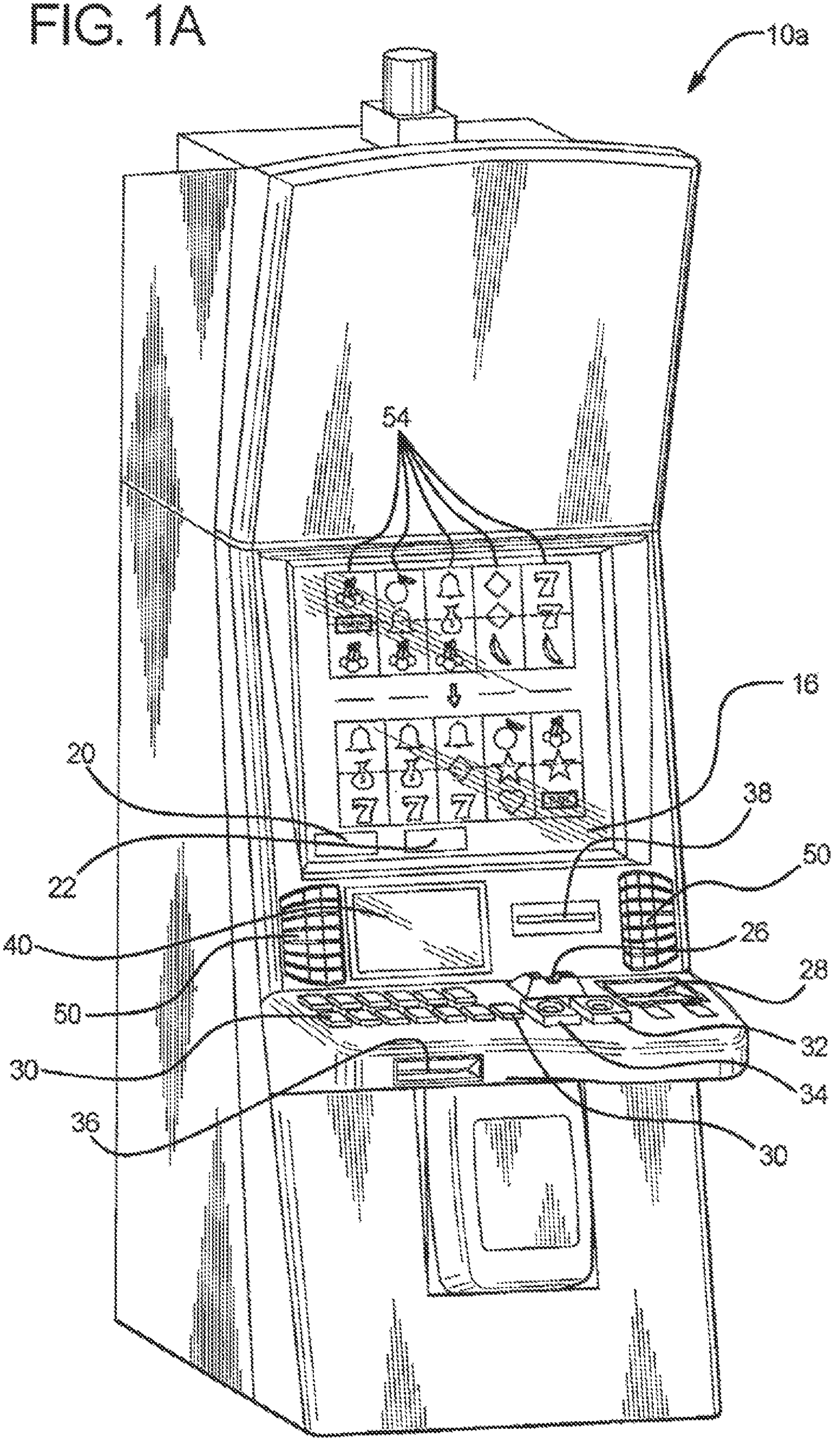
FIGS. 1A and 1B are perspective views of alternative embodiments of the gaming device disclosed herein.
Figure 1B:
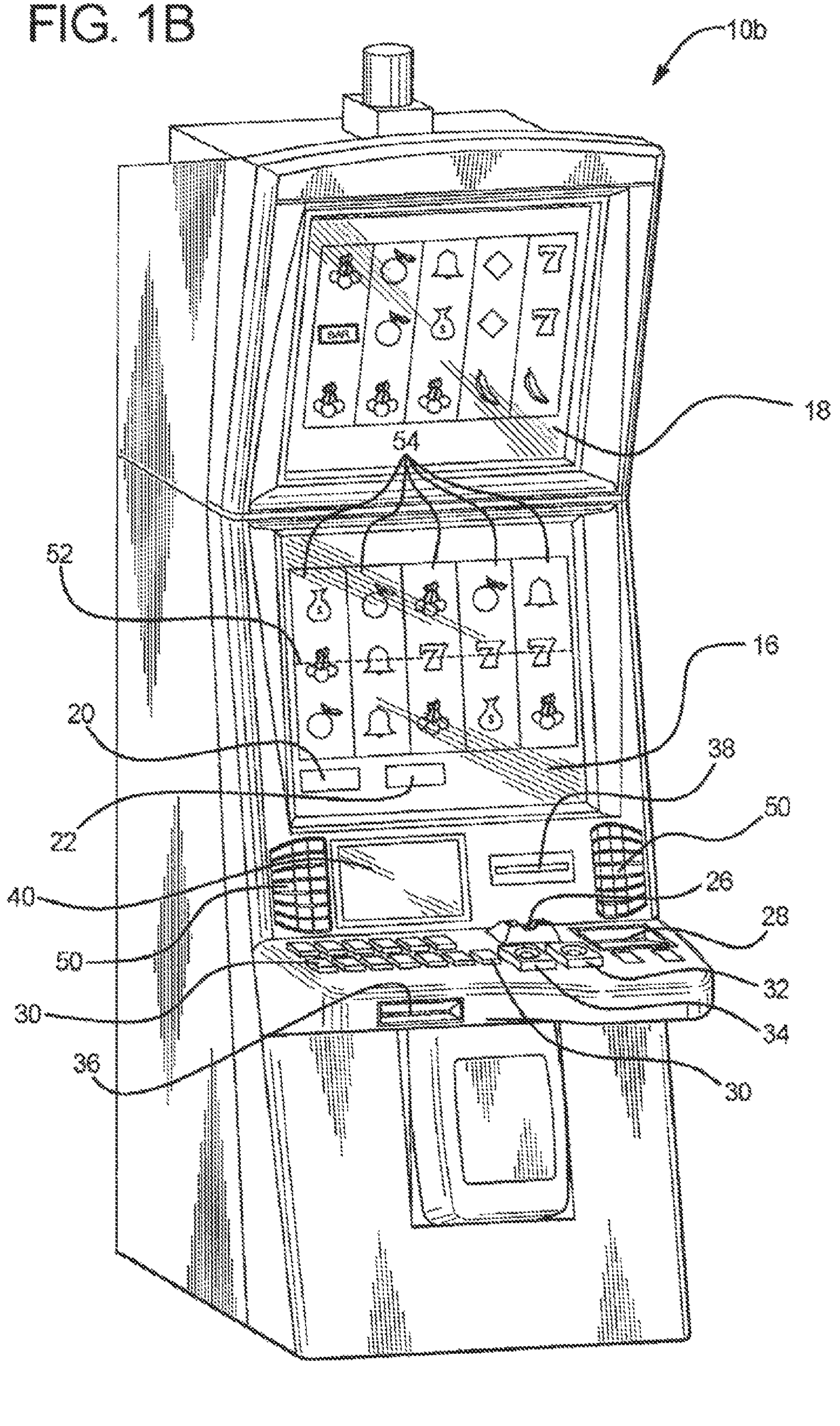

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
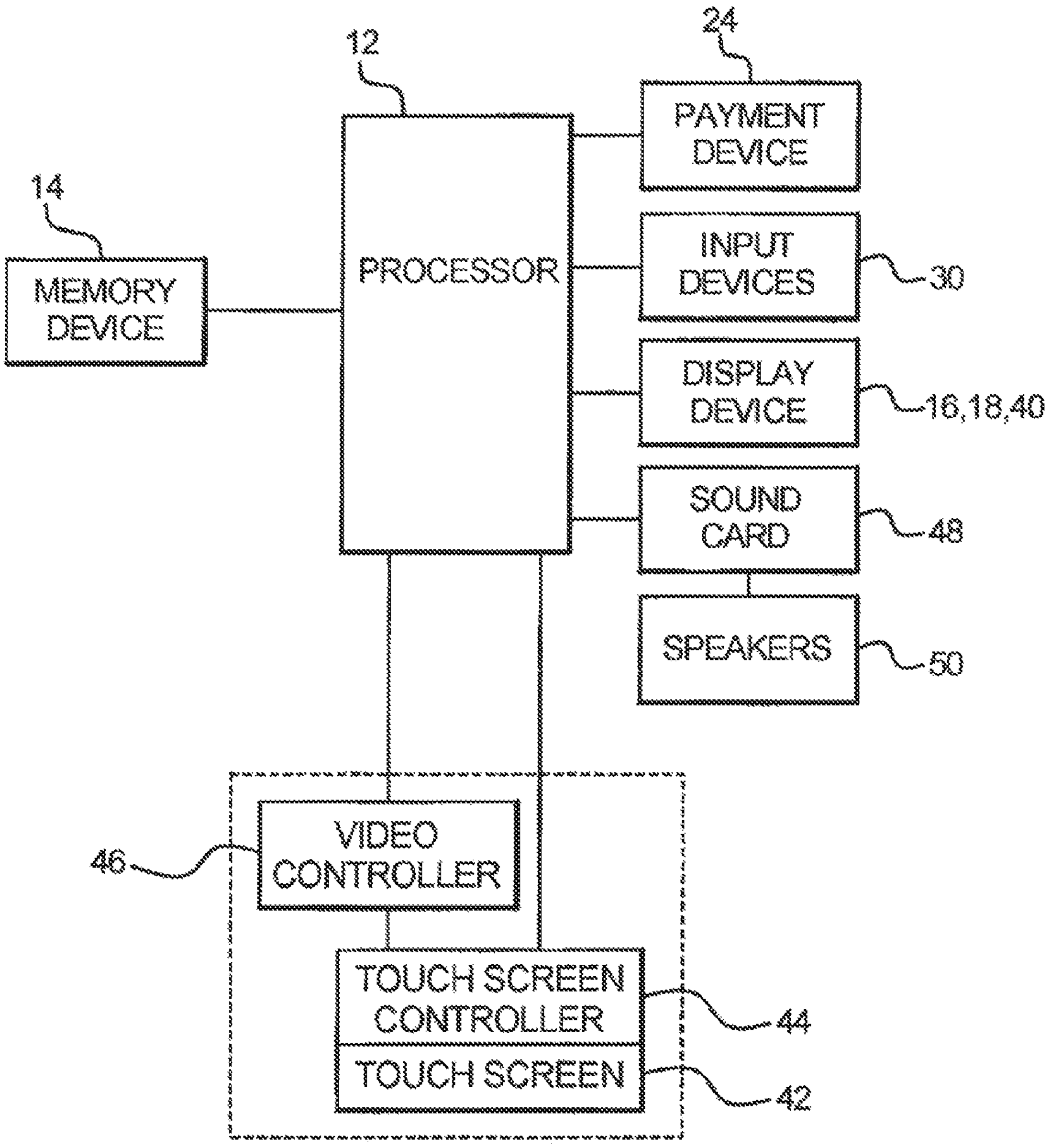
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. Moreover, as discussed in more detail below, central display device 16 and upper display device 18 may display one or more of the plurality of reel sets displayed by the gaming device. In one embodiment, the gaming device displays two reel sets, a first reel set displayed on central display device 16 and a second display device displayed on upper display device 18. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. In one embodiment, if the reel game disclosed herein is a bonus or secondary game, the primary or base game may comprise any suitable reel-type game, card game, cascading or falling symbol game, number game, or other game of chance susceptible to representation in an electronic form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in video form with simulated reels and movement thereof. In one embodiment, the slot game includes a plurality of reel sets, as disclosed herein, with each reel set including a plurality of reels. In this embodiment, the embodiments described below apply to each reel set of the plurality of reel sets.

In one embodiment, if the reels 54 are in video form, one or more of the display devices, as described above, displays the plurality of simulated video reels 54.

In another embodiment, as described above, the display devices display the plurality of reel sets. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, when the slot game described herein is provided as a bonus or secondary game, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, when the slot game disclosed herein is provided as a bonus or secondary game, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, when the slot game disclosed herein is provided as a bonus or secondary game, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, when the slot game described herein is the base or primary game, in addition to winning credits or other awards in the slot game disclosed herein, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
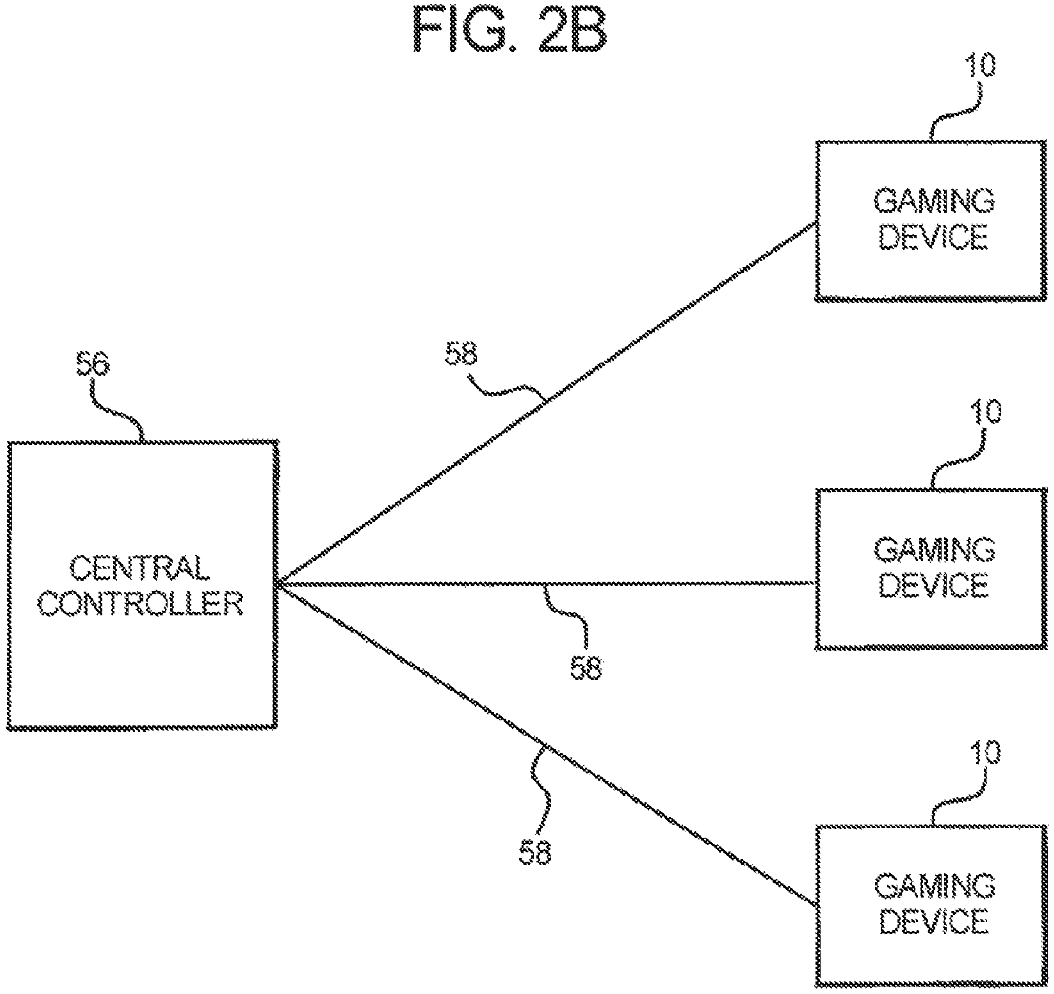
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Transferring Symbols Between Linked Reels in Multiple Reel Sets

Figure 3A:
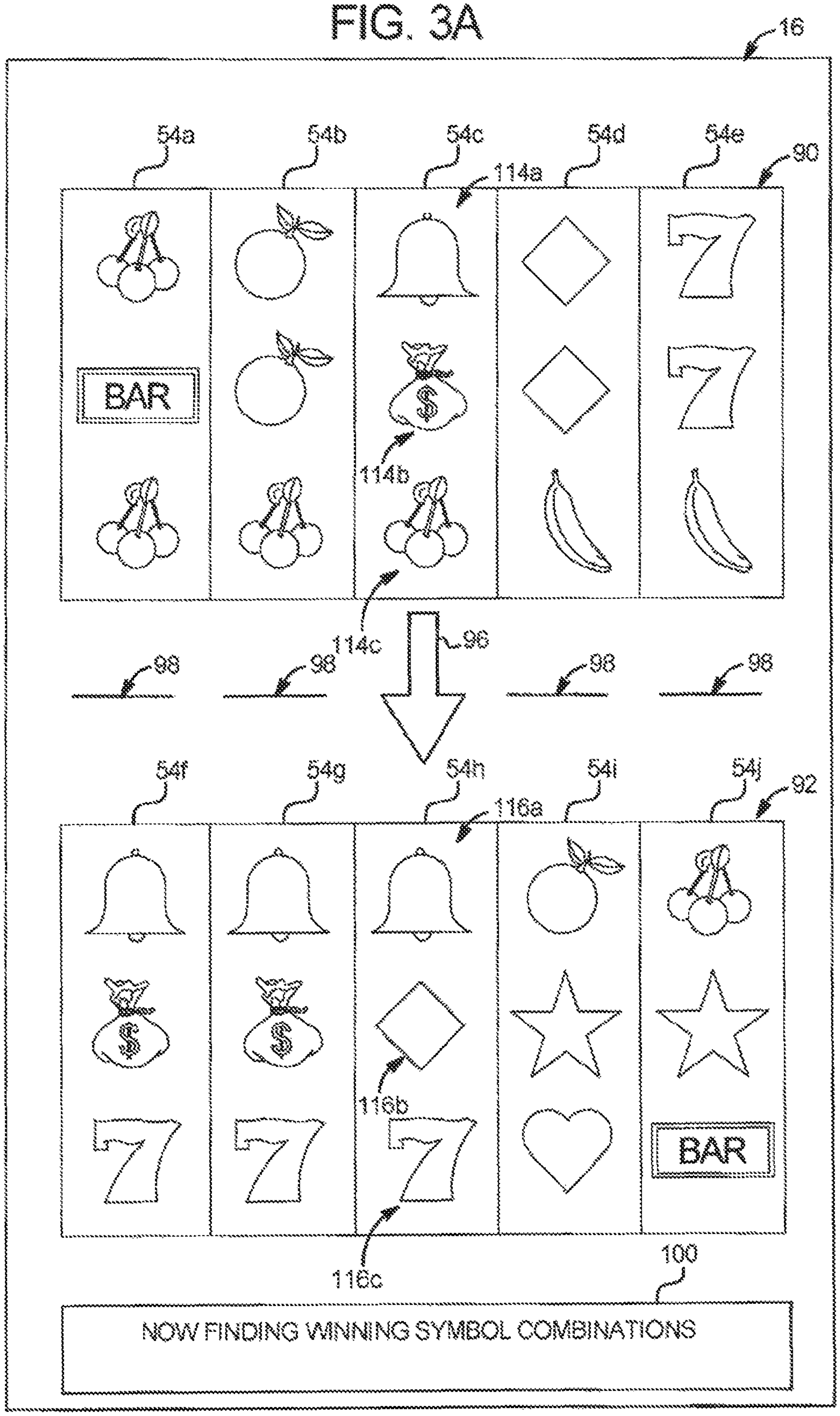
FIGS. 3A, 3B, 3C, 3D, and 3E are front elevation views of the display screen of one embodiment of the gaming device disclosed herein indicating the generation of symbols, determination of winning symbol combinations, removal of symbols, and shift or transfer of symbols from one reel to another, linked reel.

One embodiment of the gaming device disclosed herein displays a plurality of matrices as a plurality of independent reel sets. Each reel set includes a plurality of reels, and each reel includes a plurality of symbol positions. In one embodiment, a reel set is represented as a matrix of symbol positions, with each column corresponding to a reel in the reel set. FIG. 3A illustrates a gaming device including two matrices, with each matrix being indicated by reel set 90 or 92. As illustrated in FIG. 3A, the gaming device displays reel sets 90 and 92 on display screen 16. Display screen 16 contains message display area 100, in which the gaming device displays messages to the player throughout the course of a play of the game. Each reel set 90 and 92 contains five reels 54. For each reel set 90 and 92, the reels 54 are aligned vertically with respect to the gaming device. Reel set 90 is aligned with reel set 92 such that each reel 54 in reel set 90 lines up with one reel 54 in reel set 92. In one embodiment, the plurality of reel sets are displayed in close physical proximity and are displayed such that the reels in each of the plurality of reel sets are aligned with each other. In different embodiments, this alignment may be vertically, horizontally, diagonally, or in some other suitable alignment.

In one embodiment, the gaming device disclosed herein indicates to the player that at least a first reel in at least a first reel set is linked to at least a second reel in at least a second reel set. In one embodiment, the gaming device indicates this linking by the alignment of reels in the reel sets. In this embodiment, the reel sets are displayed in physical proximity and the first reel in the first reel set is aligned with the second reel in the second reel set. In another embodiment, the gaming device indicates which reels are linked by displaying an indicator on the display screen on which the reel sets are displayed.

In one embodiment, the player may cause more than one set of reels to be linked. In one embodiment, linking more than one set of reels increases the probability of generating additional winning symbol combinations after shifting or transferring. In this embodiment, the number of linked reels is based on a wager. If a player places a first wager, a first number of sets of reels are linked; if a player places a second, greater wager, a second, greater number of sets of reels are linked. In one embodiment, the player determines which additional sets of reels are linked together. In another embodiment, the gaming device randomly determines the additional reels to be linked.

As illustrated in FIG. 3A, reel 54*c* is linked to reel 54*h*. Reel 54*c* is aligned with reel 54*h*, and the gaming device communicates this linking to the player by way of indicator 96. As further illustrated, none of the other reels 54*a*, 54*b*, 54*d*, 54*e*, 54*f*, 54*g*, 54*i*, or 54*j* are linked to any other reel. Despite their alignment, the gaming device indicates that none of the other reels 54 are linked by displaying indicators 98. In one embodiment, the gaming device includes a plurality of reels of one reel set linked to a plurality of reels of another reel set. In one such embodiment, the first reel in the first reel set is linked to the first reel in the second reel set and a second reel in the first reel set is linked to a second reel in the second reel set. In one embodiment, each reel is aligned with each reel linked to it in a plurality of reel sets.

In one embodiment, each reel in each reel set includes a plurality of symbol positions. In one embodiment, after the player initiates play of the game by making a suitable wager, the gaming device generates and displays a symbol in each symbol position on each reel in the first reel set. The gaming device then independently generates and displays symbols for each of the plurality of reel sets. That is, the gaming device generates symbols to fill the symbol positions on the reels in each reel set separate from generation of symbols to fill the symbol positions on reels in any other reel set. In one embodiment, the generation and display of symbols for each reel set is separate by a discernable amount of time.

In one embodiment, the gaming device generates and displays the symbols from a symbol map that uniquely corresponds to each reel set. In another embodiment, the symbol maps for one or more of the reel sets contain symbols that are not contained on the symbol maps for any of the other reel sets. In operation of this embodiment, the gaming device generates and displays symbols in one reel set that cannot be generated or displayed in any other reel set. In still another embodiment, the symbols are generated for each reel based on a reel strip that may or may not be the same for more than one of the plurality of reels in one or more reel sets.

In another embodiment, the gaming device generates and displays the symbols from a symbol map that uniquely corresponds to each individual reel in each reel set. In one embodiment, if the gaming device detects an acceptable triggering event, the gaming device generates and displays symbols in the symbol positions of the reels in the remainder of the plurality of reel sets. In different embodiments, the determination of whether the triggering event occurs is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. In one embodiment, the gaming device generates symbols for the reels in the first reel set, then pauses to enable the player to determine whether the player wishes to make an additional wager to activate the reels in a second reel set. In any embodiment, the generation and display of symbols for each of a plurality of reel sets is performed independently.

As illustrated in FIG. 3A, each reel 54 includes three symbol positions. As further illustrated in FIG. 3A, the symbols generated and displayed in the plurality of symbol positions on reel 54*c* are a bell symbol 114*a*, a moneybag symbol 114*b*, and a cherry symbol 114*c*. Additionally, the gaming device generates and displays a bell symbol 116*a*, a diamond symbol 116*b*, and a seven symbol 116*c* in the plurality of symbol positions on reel 54*h*. It should be appreciated that the gaming device may select and display any suitable symbol, and in one embodiment the symbols generated and displayed relate to the theme of the gaming device. As illustrated in FIG. 3A, in one embodiment, after generating the appropriate symbols, message display area 100 displays an appropriate message such as "NOW FINDING WINNING SYMBOL COMBINATIONS." In one embodiment, the gaming device communicates this message through another suitable audio or audiovisual display.

Figure 3B:
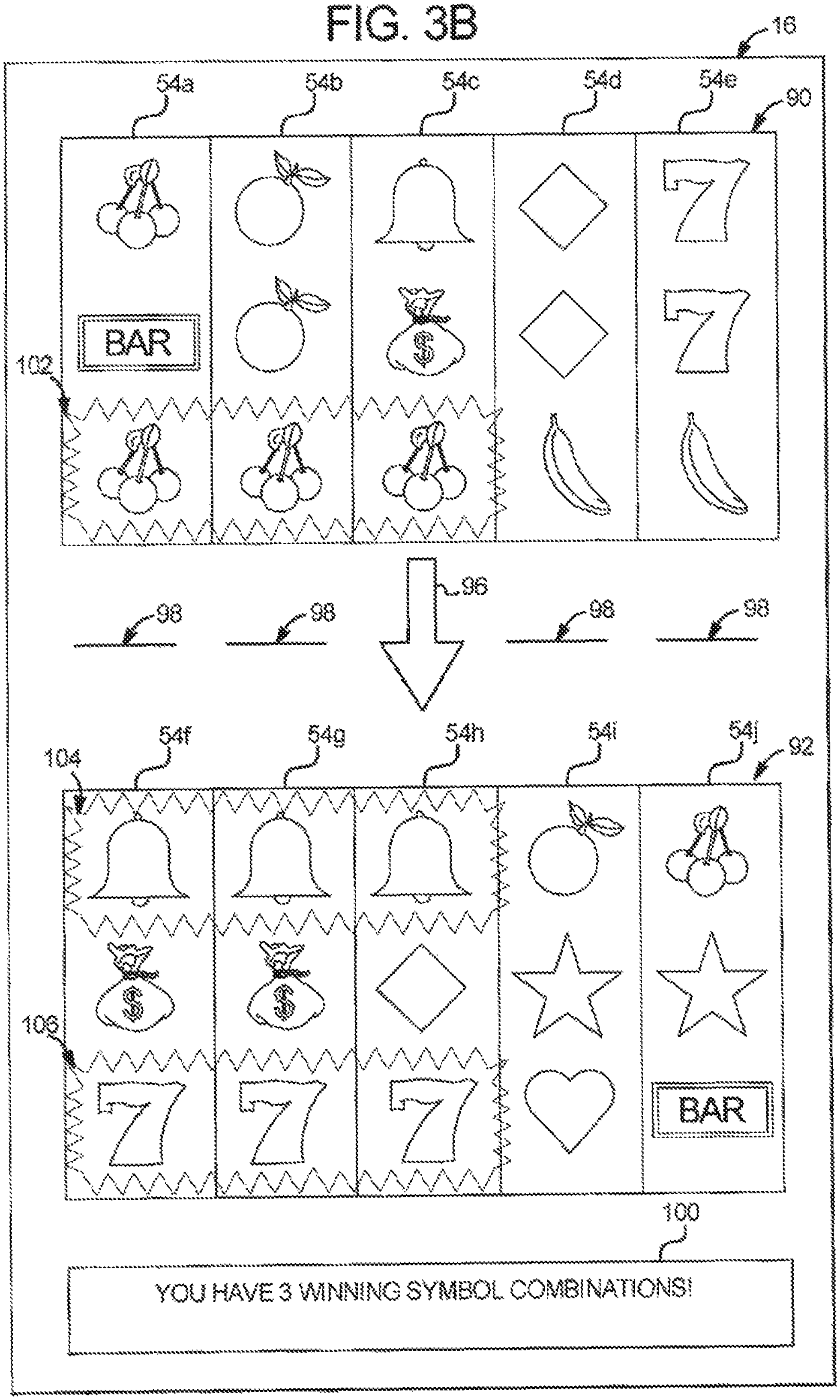

In one embodiment, the gaming device analyzes the symbols generated in the symbol positions to determine any winning symbol combinations. The gaming device indicates the winning symbol combinations to the player, and provides the player with any determined award. As illustrated in FIG. 3B, the gaming device indicates winning symbol combinations 102, 104, and 106 by highlighting lines representing the corresponding paylines. In one embodiment, the gaming device indicates the number of winning symbol combinations by displaying a message in display area 100 such as "YOU HAVE 3 WINNING SYMBOL COMBINATIONS!" In one embodiment, the gaming device communicates this message through another suitable audio or audiovisual display. After indicating the winning symbol combinations to the player, the gaming device provides the player with any awards corresponding to the winning symbol combinations.

Figure 3C:
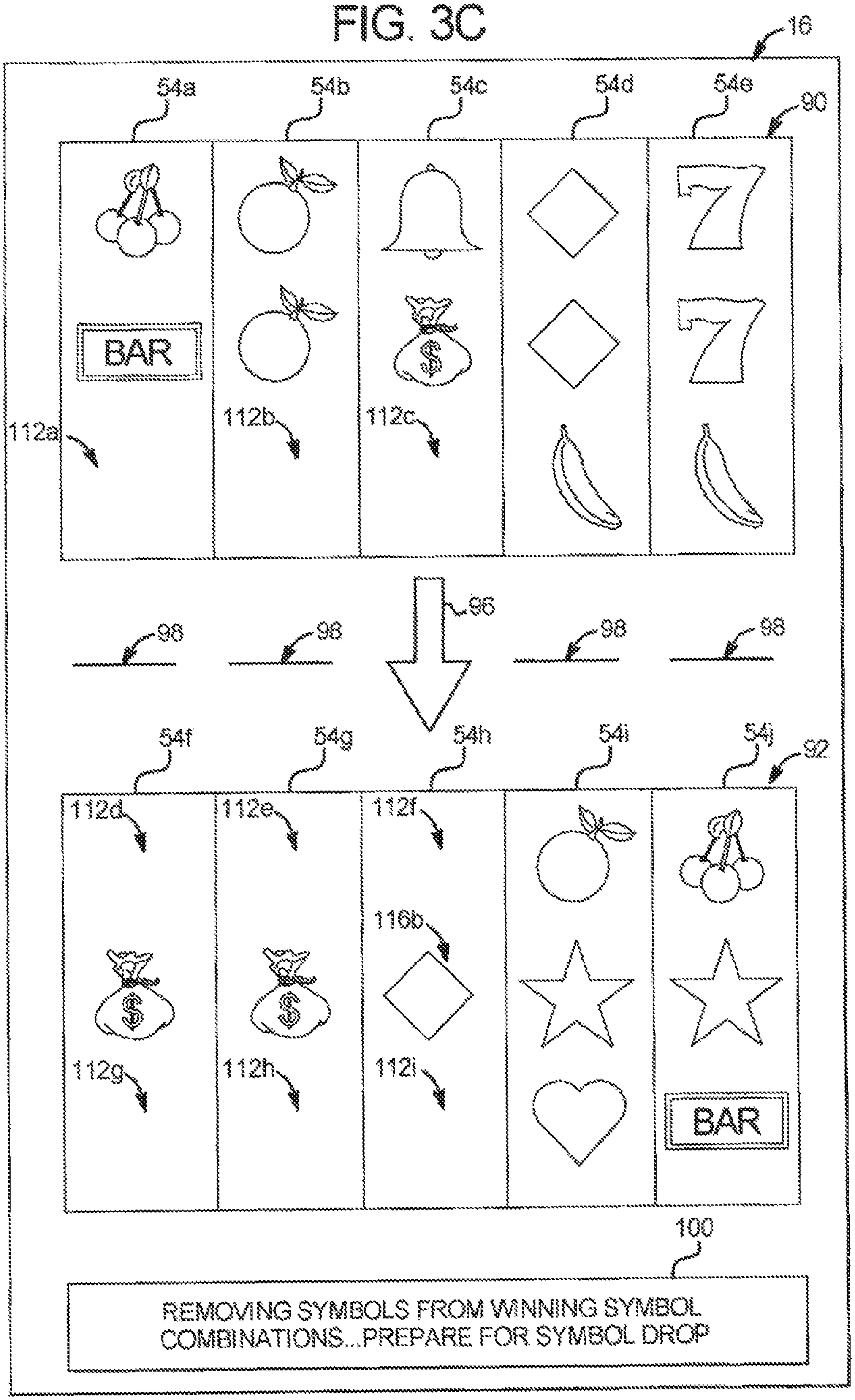

In one embodiment, the gaming device removes each symbol that is part of a winning symbol combination from its symbol position. When it removes the symbols, the gaming device creates an empty symbol position. FIG. 3C illustrates reel sets 90 and 92 after the symbols that were part of any winning symbol combination were removed. As illustrated, removing these symbols results in blank symbol positions 112. It will be appreciated that to increase the enjoyment, excitement, and overall gaming experience to the player, the blank symbol positions in one embodiment will be displayed for a discernable amount of time for a player. Moreover, in one embodiment, the gaming device indicates that it is removing the symbols from the winning symbol combinations. In this embodiment, the gaming device also indicates to the player that the empty symbol locations created will be filled by shifting or transferring existing symbols. In FIG. 3C, the gaming device communicates this by displaying a message in message display area 100 such as "REMOVING SYMBOLS FROM WINNING SYMBOL COMBINATIONS . . . PREPARE FOR SYMBOL DROP." In one embodiment, the gaming device communicates this message through another suitable audio or audiovisual display.

In one embodiment, for each reel that is linked to one or more other reels, the gaming device shifts or transfers all symbols on all linked reels in one direction until there are no empty symbol positions that could be filled by shifting or transferring any symbols in that same direction. In this embodiment, the gaming device shifts or transfers symbols from one linked reel to another linked reel. In one embodiment, the gaming device shifts or transfers symbols from one linked reel to the other linked reel until either there are no empty symbol positions on the linked reel in the direction of the shift or transfer or until there are no symbols remaining on the reel opposite the direction of the shift or transfer. In one embodiment, the gaming device maintains the position of the symbols relative to one another.

Figure 3D:
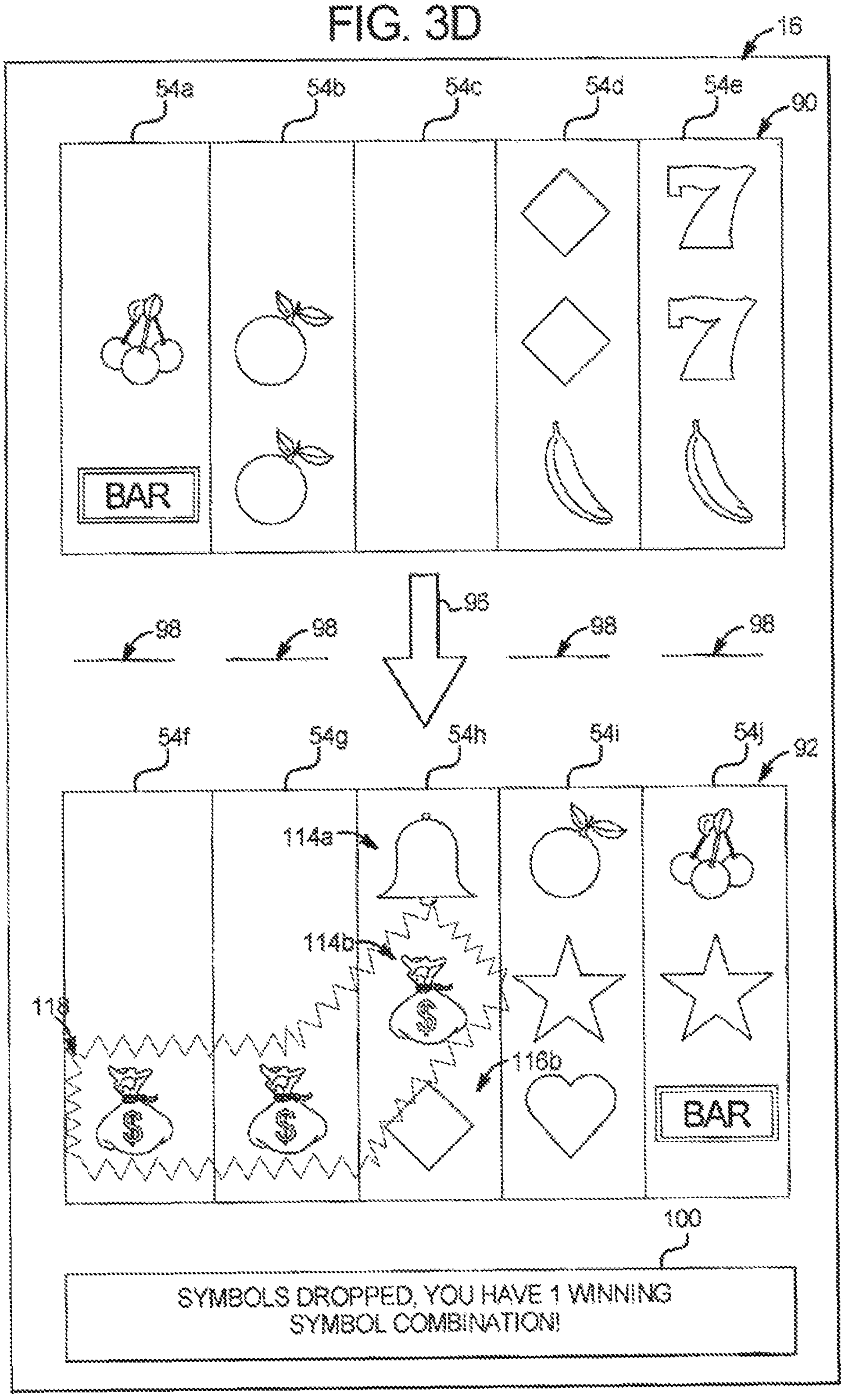

As illustrated in FIG. 3C, when the gaming device removes symbols that were part of any winning symbol combination, empty symbol position 112*c* results on reel 54*c* and empty symbol positions 112*f* and 112*i* result on reel 54*h*. As illustrated in FIG. 3D, the gaming device shifts or transfers the diamond symbol 116*b* downward as far as possible on reel 54*h*. The gaming device also shifts or transfers the bell symbol 114*a* and the moneybag symbol 114*b* downward as far as possible on reel 54*h*. After performing the shifting or transferring for reels 54*c* and 54*h*, the only two reels illustrated in FIG. 3D that are linked to each other, reel 54*c* contains three empty symbol positions and reel 54*h* contains a bell symbol 114*a*, a moneybag symbol 114*b*, and a diamond symbol 116*b*. As further illustrated in FIG. 3D, the shifting or transferring maintained the position of the three symbols relative to one another.

In one embodiment, for each reel that is not linked to any other reel, the gaming device shifts or transfers all symbols on the reel in one direction until there are no empty symbol positions that could be filled by shifting or transferring any symbols the same direction. In this embodiment, the gaming device does not shift or transfer any symbol from one reel to another reel. In one embodiment, the gaming device maintains the position of the symbols relative to one another. As illustrated in FIG. 3C and FIG. 3D, the gaming device shifts or transfers the symbols on reels 54*a*, 54*b*, 54*f*, and 54*g* downward to fill empty symbol positions 112*a*, 112*b*, 112*g* and 112*h*. The gaming device performs these shifts or transfers without changing the position of the symbols relative to one another.

In one embodiment, after shifting or transferring the symbols, the gaming device again determines any winning symbol combinations. As illustrated in FIG. 3D, the gaming device identifies winning symbol combination 118. In one embodiment, the gaming device indicates the winning symbol combinations to the player by displaying a message in message display area 100 such as "SYMBOLS DROPPED, YOU HAVE 1 WINNING SYMBOL COMBINATION!" In another embodiment, the gaming device communicates this message through another suitable audio or audiovisual display. In one embodiment, for each winning symbol combination, the gaming device provides the player with an award. In another embodiment, the gaming device removes the symbols in any winning symbol combinations and again shifts or transfers symbols to fill empty symbol positions as described above.

In another embodiment, if the gaming device cannot identify a winning symbol combination, the gaming device generates and displays a symbol from the appropriate symbol map in each blank symbol position on each reel in each reel set.

Figure 3E:
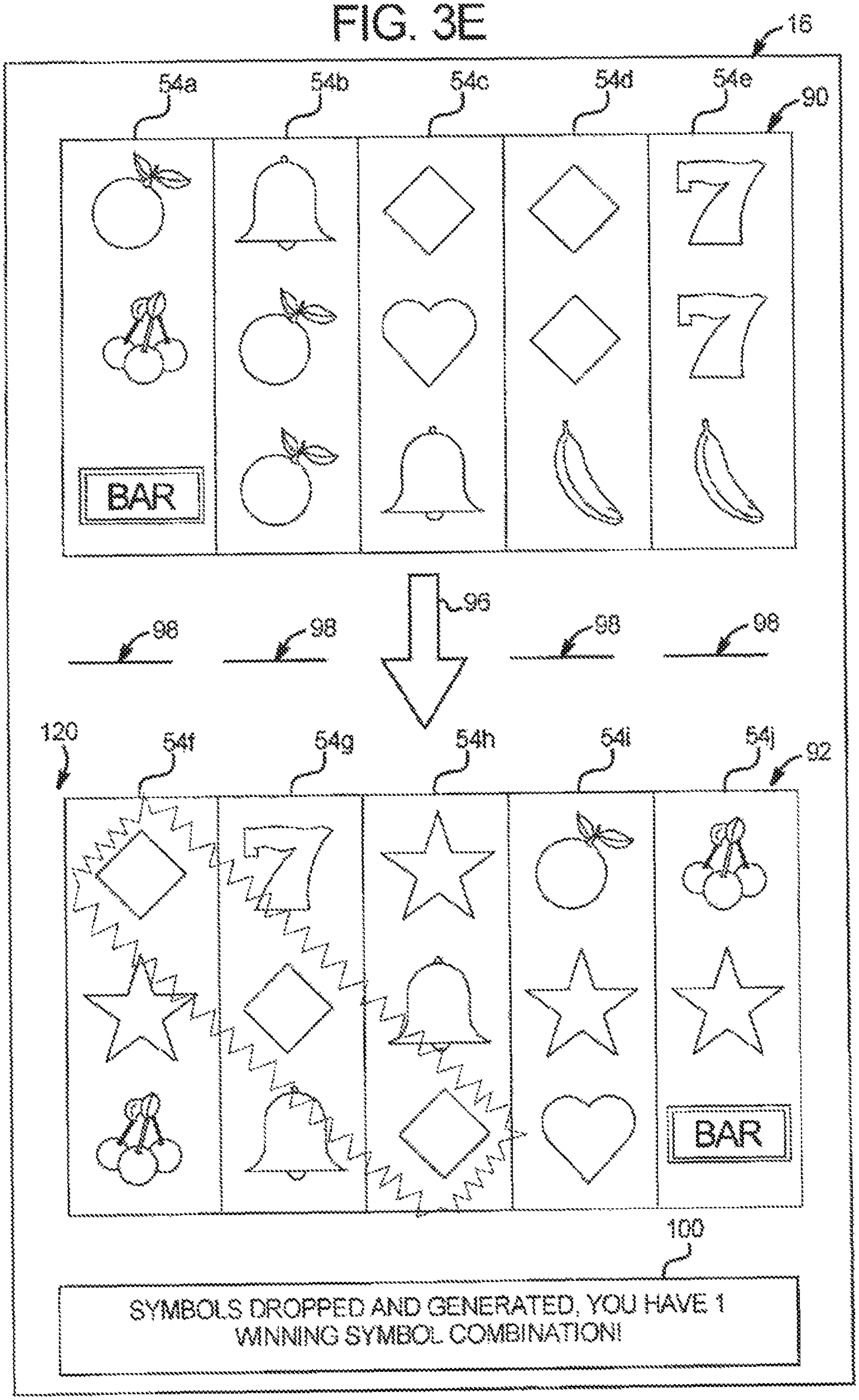

In one embodiment, the gaming device determines any winning symbol combinations and provides the player with a corresponding award. As illustrated in FIG. 3E, the gaming device generates and displays symbols in each blank symbol position on reels 54*a*, 54*b*, 54*c*, 54*f*, and 54*d* and determines that winning symbol combination 120 is present. In one embodiment, the gaming device communicates this to the player by displaying a message in message display area 100 such as "MORE SYMBOLS DROPPED AND NEW SYMBOLS GENERATED, YOU HAVE 1 WINNING SYMBOL COMBINATION!" In one embodiment, the gaming device communicates this message through another suitable audio or audiovisual display. In one embodiment, after determining any winning symbol combinations, the gaming device again removes the symbols in the winning symbol combination and repeats the shifting or transferring as described above. In another embodiment, the gaming device ends the game after determining any winning symbol combinations.

In another embodiment, after the player places a wager, the gaming device generates and displays symbols at a plurality of symbol positions on a plurality of reels in a plurality of reel sets. In one embodiment, at least one reel in a first reel set is linked to at least one reel in a second reel set. In one embodiment, after providing any awards for any generated symbols, the gaming device shifts or transfers each symbol on the reel in the first reel set and each symbol on the reel in the second reel set by at least one position in a given direction. In this embodiment, at least one symbol from the first reel in the first reel set is shifted or transferred to the second, linked reel in the second reel set. In a further embodiment, at least one empty symbol position is created on at least one of the linked reels and at least one symbol is removed from at least one of the linked reels when the gaming device shifts or transfers symbols on linked reels.

Figure 4A:
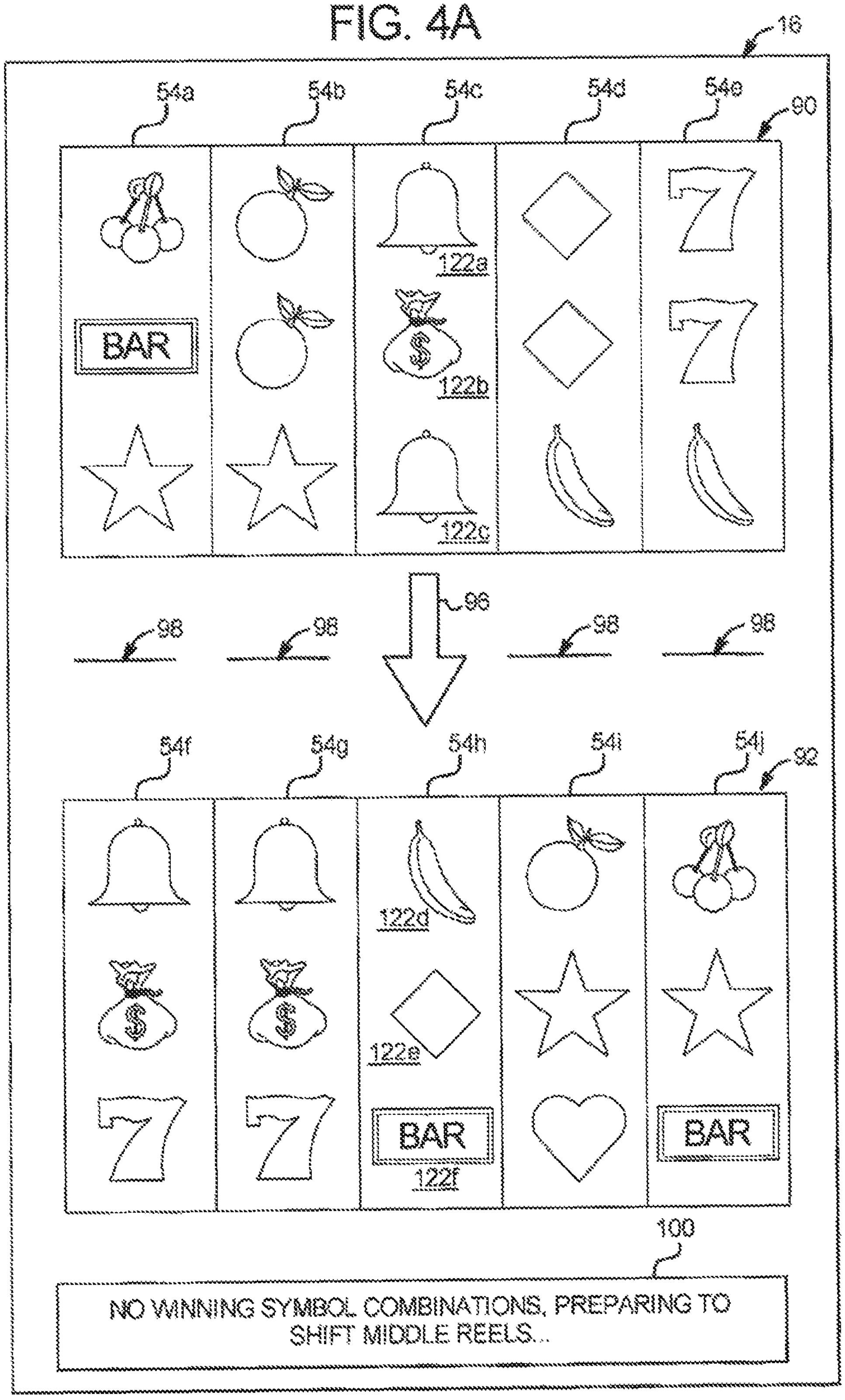
FIGS. 4A and 4B are front elevation views of the display screen of one embodiment of the gaming device disclosed herein illustrating shifting or transferring all the symbols on each linked reel in two reel sets.

As illustrated in FIG. 4A, the gaming device displays reel sets 90 and 92 on display screen 16. The gaming device also displays message display area 100. Each reel set 90 and 92 contains five reels 54, and each reel 54 includes three symbol positions. Reel 54*c* is linked to reel 54*h* as indicated by indicator 96 and the alignment of the reels, and none of the other reels are linked to any other reels, as indicated by indicators 98. The gaming device generates symbols at each symbol position. On reel 54*c*, the gaming device generates a bell symbol 122*a*, a moneybag symbol 122*b*, and a bell symbol 122*c*. On reel 54*h*, the gaming device generates a banana symbol 122*d*, a diamond symbol 122*e*, and a bar symbol 122*f*. The gaming device does not identify any winning symbol combinations. Therefore, as illustrated in FIG. 4A, the gaming device communicates that it did not identify any winning symbol combinations to the player by displaying a message in message area 100 such as "NO WINNING SYMBOL COMBINATIONS, PREPARING TO SHIFT MIDDLE REELS . . . ." In one embodiment, the gaming device communicates this message through another suitable audio or audiovisual display.

Figure 4B:
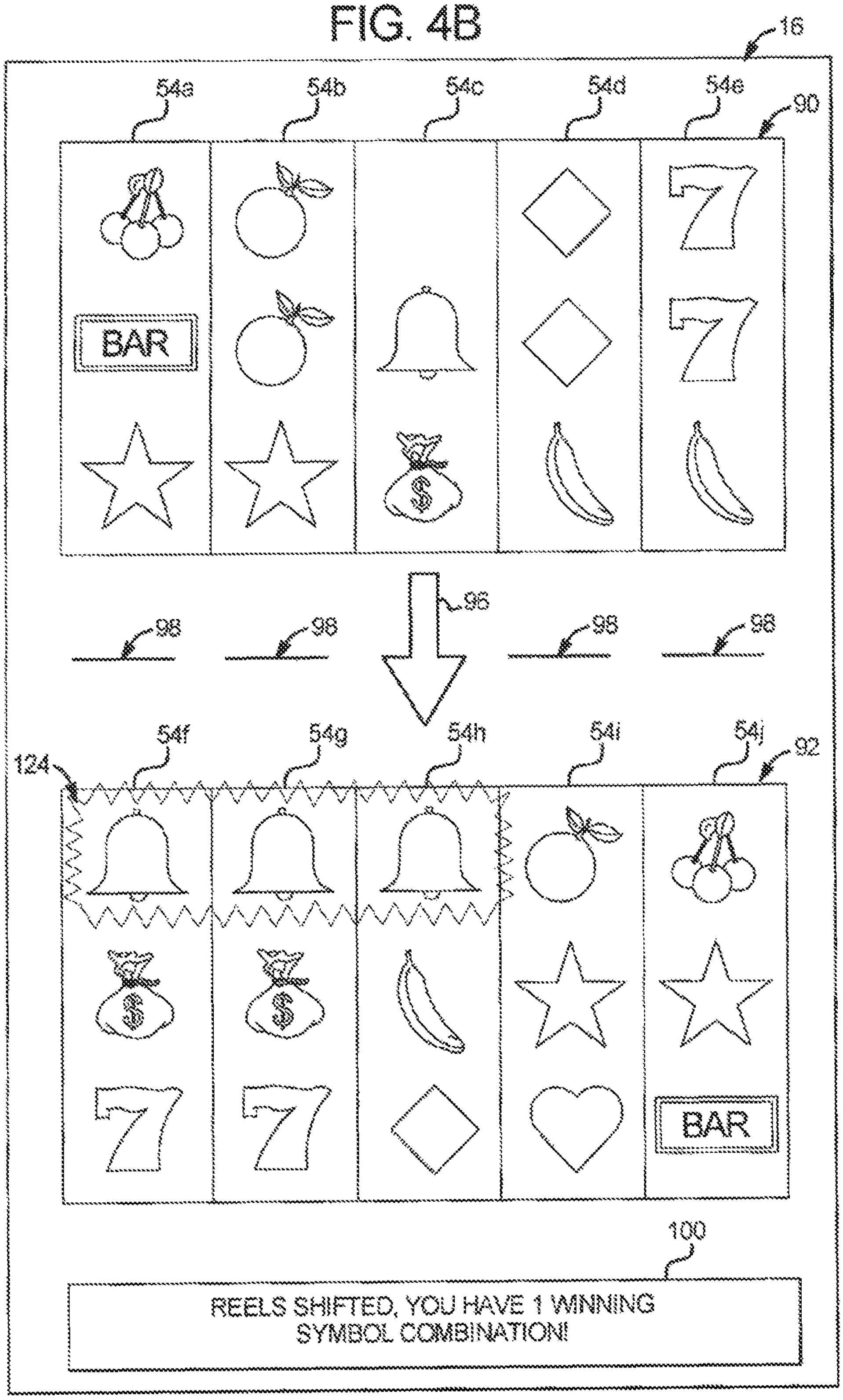

Referring now to FIG. 4B, the gaming device shifts or transfers the symbols on reels 54*c* and 54*h* downward by one position. In this embodiment, the order of the symbols relative to one another remains unchanged. The gaming device removes bar symbol 122*f* from reel 54*h* and moves the banana symbol 122*d* and the diamond symbol 122*e* down by one symbol position. The gaming device then moves the bell symbol 122*c* to the top symbol position on reel 54*h*, and moves the bell symbol 122*a* and the moneybag symbol 122*b* down by one position on reel 54*c*. As illustrated by FIG. 4B, one empty symbol position remains on reel 54*c* after the gaming device performs this shift or transfer.

Moreover, as illustrated in FIG. 4B, the gaming device identifies winning symbol combination 124 after it performs the shift or transfer on linked reels 54*c* and 54*h*. In one embodiment, the gaming device communicates the number of generated winning symbol combinations by displaying a message in the message display area such as "REELS SHIFTED, YOU HAVE 1 WINNING SYMBOL COMBINATION!" In one embodiment, the gaming device communicates this message through another suitable audio or audiovisual display. In one embodiment, the gaming device provides the player with the appropriate award. In one embodiment, the gaming device repeats the shift or transfer one or more times. In another embodiment, the gaming device removes the symbols that were part of a winning symbol combination and performs the shift or transfer described above. In another embodiment, the gaming device ends the game after providing the player with an award.

The gaming device disclosed herein enables the gaming device to vary the player's probability of obtaining an award based on which reels are linked. If the gaming device assesses winning symbol combinations from left to right, the farther to the left a set of linked reels is positioned within a reel set, the more likely a winning symbol combination will include a symbol on one of the reels in the set of linked reels. Similarly, if the winning symbol combinations are determined from right to left, the farther to the right a set of linked reels is positioned within a reel set, the more likely the winning symbol combination will include a symbol on one of the reels in the set of linked reels. In either embodiment, if the winning symbol combination includes a symbol in the linked reel set, shifting or transferring will occur and volatility will be increased.

In an alternative embodiment, winning symbol combinations are determined by a scatter pay method. In this embodiment, the likelihood that a symbol from a given reel in a reel set is included in a winning symbol combination is equal regardless of the position of linked reels in the reel sets. In this embodiment, the magnitude of the award reflects the relative statistical likelihood of a shifted or transferred symbol being included in a new winning symbol combination.

In one embodiment, each symbol map only has one symbol in common with the symbol maps of each of the plurality of other reel sets. In this embodiment, it would be rare for a shift or transfer to result in a winning symbol combination using the one symbol that both symbol maps have in common. In this embodiment, the gaming device provides a large award to reflect the relative rarity of the post-shift winning symbol combination.

In another embodiment, a plurality of symbols are specific to certain reel sets. In this embodiment, at least one symbol generated and displayed in a symbol position on a reel in one reel set can only be part of a winning symbol combination when the symbol is shifted or transferred to a different reel set and is combined in a winning symbol combination with a symbol from another reel set. This embodiment provides increased volatility of the gaming device because by transferring one or more symbols from a symbol position in one reel set to one or more symbol positions in another reel set, the gaming device is configured to provide awards for winning symbol combinations that would have been impossible without the transfer.

In another embodiment, a plurality of symbols are specific to certain reel sets. In this embodiment, at least one symbol specific to at least one reel set is configured to be part of at least one winning symbol combination on the reel set in which it is generated and displayed. In this embodiment, at least one symbol generated in a symbol position on a reel in the first reel set can also be part of a winning symbol combination when the symbol is shifted or transferred to a different reel set and is combined in a winning symbol combination with a symbol from another reel set. In this embodiment, the gaming device provides a greater award to the player when the symbol from the first reel set is transferred to the second reel set and forms a winning symbol combination with the at least one symbol from the second reel set. This embodiment also provides increased volatility because by transferring one or more symbols from a symbol position in one reel set to one or more symbol positions in another reel set, the gaming device is configured to provide awards for symbol combinations that would have been impossible without the transfer.

In one embodiment, the gaming device generates stacked symbols in the first reel set. In another embodiment, the gaming device generates wild symbols in the first reel set. In another embodiment, the gaming device generates bonus symbols in the first reel set. In these embodiments, the gaming device does not generate stacked, wild, or bonus symbols in the second reel set. In another embodiment, the stacked symbols, wild symbols, or bonus symbols cannot function as stacked symbols, wild symbols, or bonus symbols in the first reel set, but do function as such if and when they are shifted or transferred to the second reel set.

If the symbols in the second reel set form a winning symbol combination, the gaming device removes the symbols and shifts or transfers the remaining symbols in the second reel set as far as possible within each reel. The gaming device then shifts or transfers symbols in the first reel set into the corresponding linked reels in the second reel set. The gaming device then analyzes winning symbol combinations in the second reel set and provides any necessary award.

In one embodiment, the first reel set is a top reel set, positioned above and aligned with the second reel set. In this embodiment, the second reel set is a bottom reel set, positioned below and aligned with the first reel set. In one such embodiment, symbols are shifted or transferred downward. In another embodiment, the first reel set is the bottom reel set, positioned below and aligned with the second reel set. In this embodiment, the second reel set is a top reel set, positioned above and aligned with the first reel set. In one such embodiment, the symbols are shifted or transferred upward.

In one embodiment, the number of sets of linked reels is determined by the player's wager. In different embodiments, the number of sets of linked reels is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming device determines which winning symbol combinations are evaluated based on the player's wager. In another embodiment, which winning symbol combinations are eligible to provide an award is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on time (such as the time of day), determined based on an amount of coin-in accumulated in one or more pools or determined based on any other suitable method or criteria.

In another embodiment, the gaming device selects which paylines within a given reel set are active based on the player's wager. In another embodiment, which paylines within a given reel set are active is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on time (such as the time of day), determined based on an amount of coin-in accumulated in one or more pools or determined based on any other suitable method or criteria.

In one embodiment, the location of the sets of linked reels is determined by the player's wager. In different embodiments, the location of the sets of linked reels is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one alternative embodiment, the gaming device displays a plurality of reel sets that are not in close physical proximity with one another. In one embodiment, the reels in each reel set may be aligned horizontally with respect to the gaming device, vertically with respect to the gaming device, or diagonally with respect to the gaming device. In another embodiment, the reels in each reel set need not be in close proximity with the other reels in the reel set. In another embodiment, the reels of one or more of the plurality of reel sets may be represented as concentric circles.

In one embodiment, the gaming device indicates that two or more reels are linked by statically displaying an image on the cabinet of a gaming device. In another embodiment, the gaming device indicates a linking between a plurality of reels by displaying them such that the linked reels are aligned. In another embodiment, the gaming device represents the linking of two or more reels by informing the player through an audio or visual cue prior to or during play of the game. The gaming device may indicate the linking of reels in any suitable manner.

Moreover, the gaming device may link more than two reels in more than two reel sets. In one embodiment, a first reel in a first reel set is linked to a first reel in a second reel set and a first reel in a third reel set. In an alternative embodiment, one or more reels in one reel set may be linked to one or more reels in another reel set. In this embodiment, at least two reels in a first reel set are linked to at least two reels in a second reel set.

In one embodiment, the player uses one or more input devices to select which reel or reels will be linked to which other reel or reels. In another embodiment, the gaming device always links the same sets of reels. In different embodiments, the gaming device randomly selects or the player selects the linking of any reels of any reel sets before the game begins. In another embodiment, the gaming device randomly determines or the player selects the linking of at least one reel of at least one first reel set and at least a second reel of at least a second reel set after the game has begun. In one embodiment, the larger a player's wager, the more sets of linked of reels that can be chosen by the gaming device or by the player. In another embodiment, which reels are linked is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, each reel in each reel set includes the same number of symbol positions. In another embodiment, the reels of a first reel set may each include a different number of symbol positions than the reels in a second reel set. In another embodiment, the reels within a single reel set may each include a different number of symbol positions. In one embodiment, the number of active symbol positions on a given reel or in a given reel set is determined by the player's wager, as described above. In other embodiments, different reel sets include different numbers of reels.

In one embodiment, the symbols are randomly generated based on a separate random number generator seed for each reel set. In an alternative embodiment, the symbols are randomly generated for each reel set based on the same random number generator seed. In this embodiment, the seed is the same for each reel in a reel set, but the starting positions of the reels are different.

In one embodiment, the gaming device determines winning symbol combinations by analyzing paylines. In another embodiment, the gaming device determines winning symbol combinations in a scatter-pay method. In another embodiment, winning symbol combinations are determined based on the player's wagered on ways to win. In other embodiments, the gaming device may determine winning symbol combinations by using a combination of the methods described above, wherein the gaming device analyzes one or more of the above patterns for each reel set. In one embodiment, the determination of winning symbol combinations is not made in the same way for each reel set. In another embodiment, the determination of winning symbol combinations above is made from left to right, from right to left, or a combination of the two. In one embodiment, the direction of determining winning symbol combinations is different for at least one of the plurality of reel sets.

In one embodiment, the gaming device removes each symbol that is included in a winning symbol combination. In different embodiments, which symbols are removed is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

For each empty symbol position, the gaming device shifts or transfers symbols where possible to fill the empty symbol position. In one embodiment, the order of the symbols is reversed or randomized as the gaming device shifts or transfers the symbols. The relative positions of the symbols need not be maintained whether the shifting or transferring occurs on a single reel or between linked reels. In one embodiment, the gaming device does not shift or transfer in a single direction for all sets of linked reels. In one embodiment, all the symbols are shifted or transferred upward. In alternative embodiments, the symbols are shifted or transferred, downward, laterally, diagonally, radially inward, radially outward, or around the circumference of a circle. In still alternative embodiments, the symbols are shifted or transferred in a plurality of the aforementioned manners, which plurality of directions may or may not be the same for each reel or each reel set.

In one embodiment, the gaming device performs a shift or transfer for symbols on a reel not linked to any other reel. In this embodiment, the symbols on the reel are each shifted or transferred in a given direction, with zero or more of the symbols being removed from zero or more symbol positions. This shift or transfer can be performed on a reel even if there are no empty symbol positions on that reel.

In one embodiment, the shift or transfer does not result in any empty symbol positions. Instead, each of any symbol that is shifted or transferred off of any reel is moved to one of any empty symbol position resulting from the shift or transfer.

In one embodiment, the gaming device shifts or transfers symbols for any number of reels in any number of reel sets. In one embodiment, the gaming device shifts or transfers zero, one, or more sets of linked reels, and/or zero, one, or more reels not linked to any other reel. In another embodiment, any shifting or transferring is not performed in the same direction for each of the plurality of reel sets or even for each of the plurality of reels within a given reel set. Rather, in this embodiment, each reel in a reel set or each set of linked reels within a plurality of reel sets may have symbols shifted or transferred upward, downward, laterally, diagonally, around the circumference of a circle, in some other direction, or any combination of the above.

In one embodiment, if any shifting or transferring does not result in a winning symbol combination, the gaming device may repeat the shift or transfer one or more times until a winning symbol combination is achieved. If the initial generation and display of symbols on the reel sets does not result in a winning symbol combination, in one embodiment the gaming device shifts or transfers at least one set of linked reels until a winning symbol combination is obtained. In an alternative embodiment, the gaming device will perform exactly zero, exactly one, or exactly some other number of shifts or transfers regardless of whether or how often a winning symbol combination is generated.

In one embodiment, the gaming device analyzes winning symbol combinations on each reel set. In an alternative embodiment, the gaming device only analyzes winning symbol combination for the second reel set. In this embodiment, the first reel set represents a preview of or staging area for the symbols that could be shifted or transferred to fill empty symbol positions in the second reel set. This increases the excitement and enjoyment to the player. In an alternative embodiment, the gaming device analyzes winning symbol combinations in the first reel set but the paytable used to calculate the awards is less lucrative.

In one embodiment, the functionality of symbols in the first reel set changes when the symbol is shifted or transferred from the first reel set to the second reel set. In another embodiment, the functionality change is represented by a change in appearance of the symbol as it is shifted or transferred from the first reel set to the second reel set. This embodiment increases volatility because symbols that were independently generated in the first reel set have the potential to be shifted or transferred into the second reel set. Moreover, once the symbols from the first reel set occupy symbol positions in the second reel set, they increase the likelihood that additional winning symbol combinations will result.

In one embodiment, the gaming device contains a first reel set and a second reel set. In one embodiment, at least one but less than all reels in the first reel set are each linked to an aligned reel in the second reel set. In another embodiment, all the reels in the first reel set are each linked to an aligned reel in the second reel set. In another embodiment, all reels are linked to at least another reel in another reel set based on a wager made by the player. In another embodiment, whether all reels will be linked is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on time (such as the time of day), determined based on an amount of coin-in accumulated in one or more pools or determined based on any other suitable method or criteria.

The gaming device makes the game more enjoyable for players because the shifting between linked columns in a plurality of matrices provides an opportunity to use independently generated symbols from one matrix to generate winning symbol combinations in another matrix. Moreover, the gaming device disclosed increases player excitement and enjoyment because winning symbol combinations are generated after all visible winning symbol combinations have already yielded awards. Finally, the gaming device enhances the overall gaming experience because winning symbol combinations will be generated that are not immediately visible to the player.

While the present gaming device is described in connection with what are presently considered to be the most practical and preferred embodiments, it should be appreciated that the gaming device is not limited to the disclosed embodiments, and is intended to cover various modifications and equivalent arrangements included within the spirit and scope of the claims. Modifications and variations in the present gaming device may be made without departing from the novel aspects of the gaming device as defined in the claims, and this application is limited only by the scope of the claims.

The invention is claimed as follows:

1. A gaming system comprising:
- at least one display device;
- at least one input device;
- at least one processor; and
- at least one memory device which stores a plurality of instructions executable by the at least one processor to cause the at least one processor to operate with the at least one display device and the at least one input device to:
  - (a) display a plurality of reel sets, each of the reel sets including a plurality of reels;
  - (b) for each reel set, generate and display a plurality of symbols in a plurality of symbol positions associated with the reels in the reel set, wherein the generation for each reel set is independent from the generation of any other of said reel sets; and
  - (c) transfer at least one symbol from at least one symbol position associated with at least one reel in at least a first of the reel sets to at least one empty symbol position associated with at least one reel in at least a second of the reel sets.

2. The gaming system of claim 1, wherein at least one reel in the first of the reel sets is linked to at least one reel in a second of the reel sets.

3. The gaming system of claim 2, wherein when executed by the at least one processor, said plurality of instructions cause the at least one processor to enable the player to choose a plurality of said reels from said plurality of reel sets to link.

4. The gaming system of claim 1, wherein when executed by the at least one processor, said plurality of instructions cause the at least one processor to analyze a plurality of winning symbol combinations including symbols displayed on the reels in at least one but less than all of the reel sets.

5. The gaming system of claim 1, wherein when executed by the at least one processor, said plurality of instructions cause the at least one processor to remove at least one of the symbols which form at least one of any displayed winning symbol combinations.

6. The gaming system of claim 5, wherein when executed by the at least one processor, said plurality of instructions causes the at least one processor to:
- (a) for each reel in the first reel set linked to one of the reels in the second reel set, transfer at least one of any of the remaining symbols from the reel in the first reel set to one of any empty symbol positions of the removed symbols on the linked reel in the second reel set;
- (b) for each reel, transfer at least one of any of the remaining displayed symbols to one of any empty symbol positions on said reel; and
- (c) for any symbol position that does not display one of said symbols, generate and display a symbol in the symbol position previously occupied by any repositioned or removed symbol.

7. The gaming device of claim 1, wherein when executed by the at least one processor, said plurality of instructions causes the at least one processor to:
- (a) for each reel in the first reel set linked to one of the reels in the second reel set:
  - (i) remove at least one symbol from the reel in the second reel set;
  - (ii) transfer at least one symbol from the reel in the first reel set to the reel in the second reel set; and
  - (iii) transfer at least one of any remaining symbols from the reel in the first reel set to at least one of any empty symbol positions on said reel in the first reel set; and
- (b) for any symbol position that does not display one of said symbols, generate and display a symbol in the symbol position previously occupied by any repositioned or removed symbol.

8. The gaming system of claim 2, wherein less than all the reels in the first reel set are each linked to at least one reel in the second reel set.

9. A method of operating a gaming device, said method comprising:
- (a) causing at least one display device to display a plurality of reel sets, each of the reel sets including a plurality of reels;
- (b) for each reel set:
  - (i) causing at least one processor to execute a plurality of instructions to generate a plurality of symbols, wherein the generation for each reel set is independent from the generation of any other of said reel sets, and
  - (ii) causing the at least one display device to display the generated symbols in the plurality of symbol positions associated with the reels in the reel set; and
- (c) causing the at least one processor to execute the plurality of instructions to transfer at least one symbol from at least one symbol position associated with at least one reel in at least a first of the reel sets to at least one empty symbol position associated with at least one reel in at least a second of the reel sets.

10. The method of claim 9, which includes causing the at least one processor to execute the plurality of instructions to link at least one reel in the first of the reel sets to at least one reel in a second of the reel sets.

11. The method of claim 10, which includes enabling the player to choose a plurality of said reels from said plurality of reel sets to link.

12. The method of claim 9, which includes causing the at least one processor to execute the plurality of instructions to analyze a plurality of winning symbol combinations including symbols displayed on the reels in at least one but less than all of the reel sets.

13. The method of claim 9, which includes causing the at least one processor to execute the plurality of instructions to remove at least one of the symbols, which form at least one of any displayed winning symbol combinations.

14. The method of claim 13, including:
- (a) for each reel in the first reel set linked to one of the reels in the second reel set, causing the at least one processor to execute the plurality of instructions to transfer at least one of any of the remaining symbols from the reel in the first reel set to one of any empty symbol positions of the removed symbols on the linked reel in the second reel set;

(b) for each reel, causing the at least one processor to execute the plurality of instructions to transfer at least one of any of the remaining displayed symbols to one of any empty symbol positions on said reel; and (c) for any symbol position that does not display one of said symbols, causing the at least one processor to execute the plurality of instructions to operate with the at least one display device to generate and display a symbol in the symbol position previously occupied by any repositioned or removed symbol.

15. The method of claim 9, including:

(a) for each reel in the first reel set linked to one of the reels in the second reel set:

(i) causing the at least one processor to execute the plurality of instructions to remove at least one symbol from the reel in the second reel set;

(ii) causing the at least one processor to execute the plurality of instructions to transfer at least one symbol from the reel in the first reel set to the reel in the second reel set;

(iii) causing the at least one processor to execute the plurality of instructions to transfer at least one of any remaining symbols from the reel in the first reel set to at least one of any empty symbol positions on said reel in the first reel set; and (b) for any symbol position that does not display one of said symbols, causing the at least one processor to execute the plurality of instructions to operate with the at least one display device to generate and display a symbol in the symbol position previously occupied by any repositioned or removed symbol.

16. The method of claim 10, which includes causing the at least one processor to execute the plurality of instructions to link less than all the reels in the first reel set to at least one reel in the second reel set.

* * * * *

UNITED STATES PATENT AND TRADEMARK OFFICE

CERTIFICATE OF CORRECTION

PATENT NO. : 8,602,871 B2
APPLICATION NO. : 13/437453
DATED : December 10, 2013
INVENTOR(S) : William R. Wadleigh et al.

It is certified that error appears in the above-identified patent and that said Letters Patent is hereby corrected as shown below:

IN THE CLAIMS

Claim 2, Column 31, Line 48, replace “a” with --the--.
Claim 6, Column 31, Line 65, replace “causes” with --cause--.
Claim 7, Column 32, Line 11, replace “device” with --system--.
Claim 8, Column 32, Line 26, between “all” and “the” insert --of--.
Claim 9, Column 32, Line 41, replace “the” with --a--.
Claim 10, Column 32, Line 51, replace “a” with --the--.
Claim 13, Column 32, Line 61, after “symbols” delete “,”.

Signed and Sealed this
Twenty-first Day of October, 2014

Michelle K. Lee

Michelle K. Lee
*Deputy Director of the United States Patent and Trademark Office*